US006775075B1

(12) United States Patent  (10) Patent No.: US 6,775,075 B1
Solich  (45) Date of Patent: Aug. 10, 2004

(54) LINES ON PAPER MAGNIFYING GLASS

(76) Inventor: Catherine Solich, 829 SW. 15th Ave., Cape Coral, FL (US) 33991

(*) Notice: Subject to any disclaimer, the term of this patent is extended or adjusted under 35 U.S.C. 154(b) by 0 days.

(21) Appl. No.: 10/606,054

(22) Filed: Jun. 25, 2003

(51) Int. Cl.[7] .............................................. G02B 27/02
(52) U.S. Cl. ...................... 359/803; 359/802; 359/806; 359/805
(58) Field of Search ................................ 359/800, 801, 359/802, 804, 805, 806, 807, 808, 809, 799, 803; 362/97; 116/306; 273/148 R

(56) References Cited

U.S. PATENT DOCUMENTS

| | | | | |
|---|---|---|---|---|
| 3,704,938 A | * | 12/1972 | Fanselow | ..................... 359/806 |
| 5,133,554 A | * | 7/1992 | Piccinini, Sr. | .......... 273/148 R |
| 6,398,087 B2 | * | 6/2002 | Solich | .................... 223/109 R |
| 6,538,828 B1 | * | 3/2003 | Redmond | ................... 359/800 |

* cited by examiner

Primary Examiner—Tim Thompson

(57) ABSTRACT

The invention discloses a magnifying assembly that may be clamped on printed sheets or pages in a book. The assembly consists of two part. One part is an elongated magnifying glass having a flat bottom and half circle shape top. The other part is a holding element that has a receiving cage at one and an extending flat section adjacent the cage. The magnifying glass is inserted into the cage to be held therein. The magnifying glass may slide in the cage to change the size of the assembly. The friction between the bottom of the magnifying glass and the holding element is increased by providing an upstanding friction knob at one end of the holding element, by providing an upstanding friction knob on a flexible element intermediate the one end and the cage and by angling the cage relative to the flat section. thereby, by pushing the magnifying glass into the cage the flat bottom of the magnifying glass will force the cage and the flat section into a straight line.

5 Claims, 2 Drawing Sheets

LINES ON PAPER MAGNIFYING GLASS

BACKGROUND OF THE INVENTION

The invention at hand pertains to a reading aid useful for reading very fine print on paper, for reading embroidery patterns and for people having poor eye sight. It can also be used as line identifiers in books and/or legal documents. It is also useful for typists following a line by line transcript.

In order to read the above noted documents or printed items, it is known that hand held magnifying glasses are being used with the attending disadvantage that only one hand is available to perform the task at hand. There are other known magnifying glasses either round or other shapes that are merely placed on the subject to be magnified but, they can only be used in a horizontal manner.

BRIEF SUMMARY OF THE INVENTION

The inventive magnifying glass can be used in many different ways and in a hands free manner. The magnifying glass disclosed herein is clamped to a paper and the paper can be oriented in many different directions and planes. The inventive magnifying glass is also size adjustable so that it can be used on many different size papers including pages in a book.

DETAILED DESCRIPTION OF THE INVENTION

Figure 1:
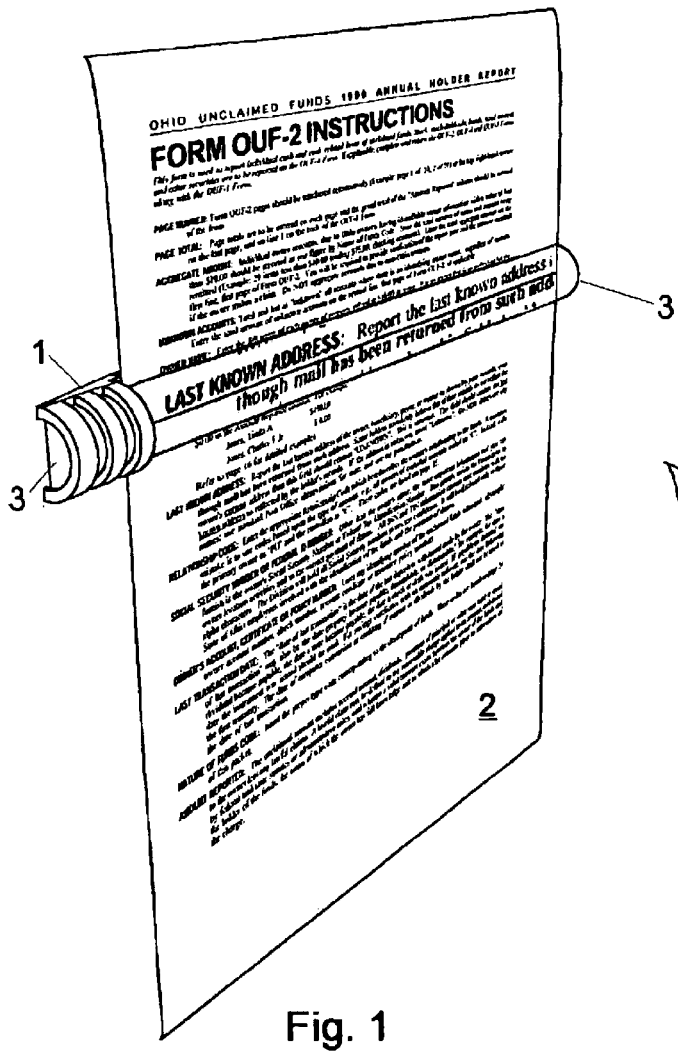
FIG. 1 is a perspective view of the magnifying glass clamped to a paper.

FIG. 1 illustrates ho the Magnifying glass is installed on a piece of paper 2. In this Fig. there is shown a single piece of paper and as it is clamped thereto. However, the magnifying glass can equally well be clamped to a page in a book. the magnifying glass is also size adjustable as will be explained below. The magnifying glass itself is identified as 3 and will be combined with a holding element 1. The magnifying glass 3 itself has a flat bottom to conform to a flat sheet of paper 2. The top of the magnifying glass is convex and is shaped into a substantially half round circle. As can be seen in FIG. 1, the lines of print on the paper are considerably magnified because of the shape of the glass. Thereby, the printed lines on the paper can easily be identified and can easily be read. This comes in very handy for a typist, for example, who has a manuscript to be typed on a stand, can easily move the magnifying glass to the next lines without wasting much time and effort. The magnifying glass is quite valuable for a person doing embroidery while following a stitch by stitch pattern. It is known that embroidery patterns are difficult to follow because the indications of stitches are quite small and it is difficult to follow the stitches line by line. The person's eyes always stray from the pattern to the work at hand and it is difficult to rediscover the line or lines to be followed on the pattern. Therefore, the inventive magnifying glass becomes a significant aid in the art of embroidery.

Figure 2:
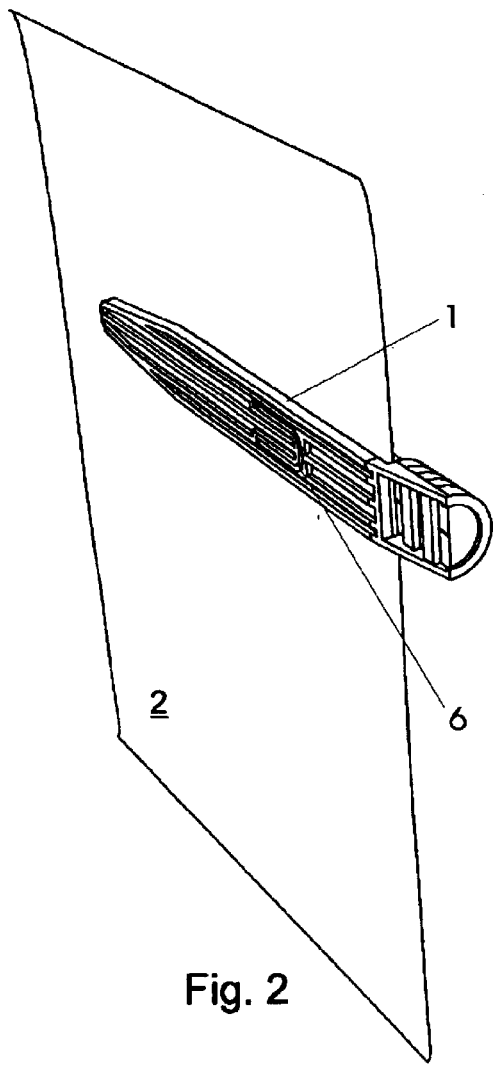
FIG. 2 is a perspective view of the rear side of the magnifying glass.

FIG. 2 shows the backside of the glass holding element 1.

Figure 3:
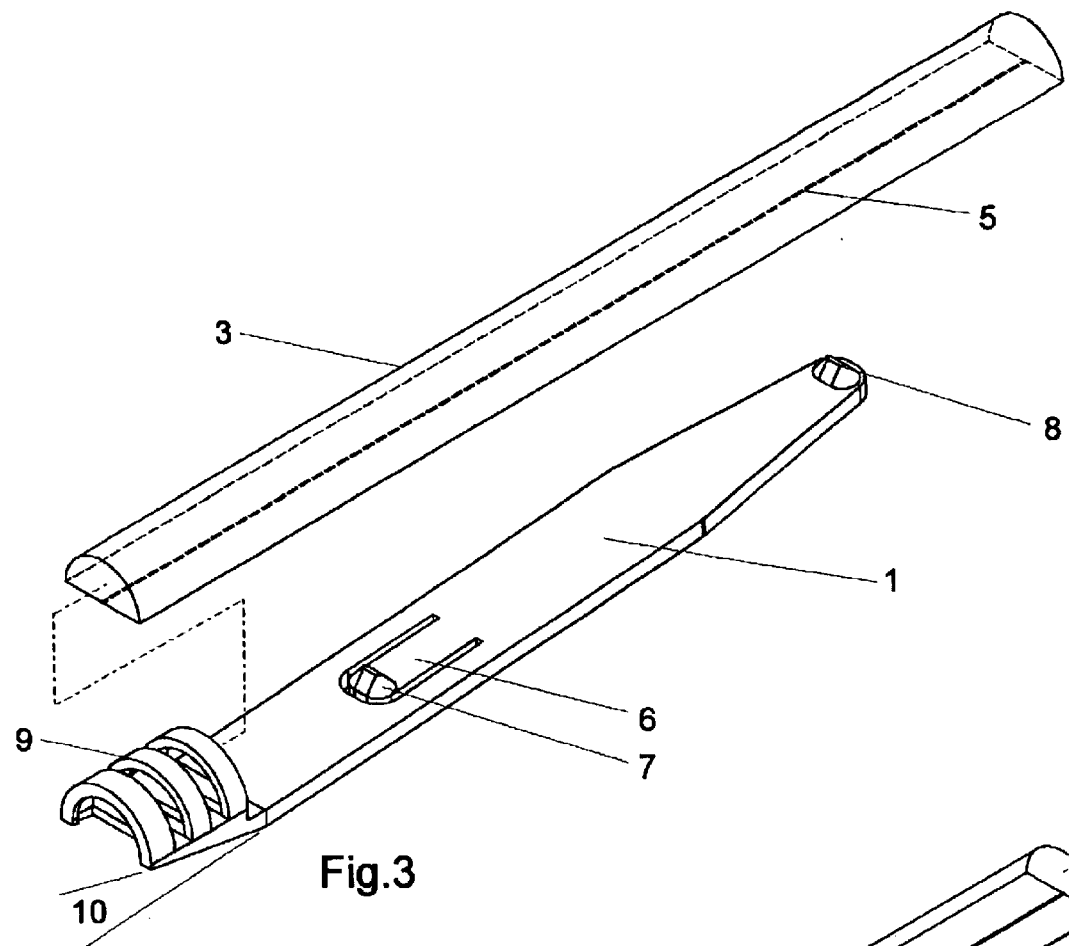
FIG. 3 is a top and an exploded view of the magnifying glass.

FIG. 3 illustrates the magnifying glass in more detail. It is an exploded view of the two basic parts of the magnifying device. The magnifying glass 3 can easily be identified as to its shape. Again the bottom is flat and the top is convex. On the bottom is engraved or etched a sight line 5. This renders the glass more precise because, mostly, more than one line can be seen while the line 5 identifies a single line. the holding element 1 is made of a clear plastic. In FIG. 3 at the left end there is a cage 9 which receives one end of the glass 3 as can clearly be seen in FIG. 1. The cage will snugly receive the glass which can slide within the cage to render the magnifying glass to different sizes. At the right hand side of the holding element 1 there is a raised friction knob 8 to increase the friction between the bottom of the glass 3 and the knob 8 once a paper is installed there between. There is also a friction knob 7 at the end of a spring element 6. This spring element is desirable so that the friction knob 7 has some give to it because it is closer to the cage 9. It is to be noted that the overall friction between the glass 3 and holding element 1 has been increased. There is an angle 10 between the cage 9 and the flat part of the holding element 1. The overall holding element is somewhat flexible so that when the glass 3 is pushed into the cage 9, it will flatten out the cage 9 relative the flat part to thereby create a snug fit between the same. It can now be seen that there are three instances whereby friction is created between the magnifying glass and any object that is placed between the glass 3 an the holding element 1. First, there is the friction knob 8, secondly, there is the friction knob 7 on the spring element 8 and thirdly, there is the angle 10 between the holding cage 8 and the flat forward part of the holding element 1.

Figure 4:
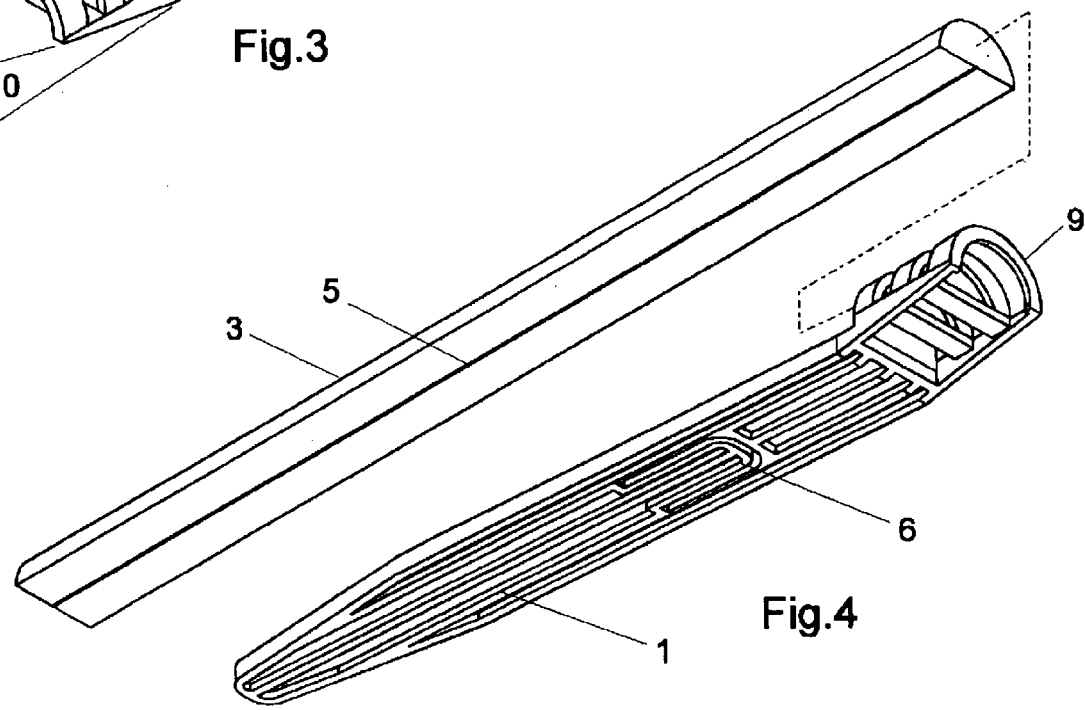
FIG. 4 is a bottom and an exploded view of the magnifying glass.

FIG. 4 shows the underside of the holding element 1 including the cage 9 and the spring element 6.

What I claim is:

1. A magnifying glass assembly adapted to magnify printed lines on a printed page, said magnifying glass consisting of two parts, a first part being an elongated magnifying glass and a second part is a holding element, said first part is an elongated magnifying glass having a flat bottom and a half circle upper shape, said second part is a holding element and has at one end thereof a cage for receiving said magnifying glass therein and a flat section extending from said cage, means for creating a friction between said magnifying glass and said holding element, whereby, when a paper is placed between said elongated magnifying glass and said flat section said friction will hold said magnifying assembly in a predetermined location including means for adjusting said magnifying glass assembly to fit different sizes of paper.

2. The magnifying glass assembly of claim 1, wherein said friction is created by placing a friction knob on a far end of said flat section.

3. A magnifying glass assembly adapted to magnify printed lines on a printed page, said magnifying glass consisting of two parts, a first part being an elongated magnifying glass and a second part is a holding element, said first part is an elongated magnifying glass having a flat bottom and a half circle upper shape, said second part is a holding element and has at one end thereof a cage for receiving said magnifying glass therein and a flat section extending from said cage, means for creating a friction between said magnifying glass and said holding element, whereby, when a paper is placed between said elongated magnifying glass and said flat section, said friction will hold said magnifying glass assembly in a predetermined location, wherein said friction is created by placing a friction knob on a flexible element midway between and end of said flat section and said cage.

4. The magnifying glass assembly of claim 1, wherein said friction is created by angling said cage relative to said flat section, whereby, when said magnifying glass is inserted into said cage, said flat bottom of said magnifying glass will force a straight line between said cage and said flat section to trap any paper inserted there between.

5. The magnifying assembly of claim 1 including a sight line is placed on said flat bottom of said magnifying glass.

* * * * *